(12) United States Patent
Nakauchi et al.

(10) Patent No.: US 8,605,412 B2
(45) Date of Patent: Dec. 10, 2013

(54) GAS INSULATED SWITCHGEAR

(75) Inventors: Shinichiro Nakauchi, Tokyo (JP);
Osamu Kisanuki, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 130 days.

(21) Appl. No.: 13/496,521

(22) PCT Filed: Oct. 5, 2009

(86) PCT No.: PCT/JP2009/067350
§ 371 (c)(1),
(2), (4) Date: Mar. 16, 2012

(87) PCT Pub. No.: WO2011/042947
PCT Pub. Date: Apr. 14, 2011

(65) Prior Publication Data
US 2012/0175971 A1    Jul. 12, 2012

(51) Int. Cl.
*H02B 5/00* (2006.01)
(52) U.S. Cl.
USPC .......... 361/602; 361/601; 361/611; 361/612; 361/618; 361/619; 361/620
(58) Field of Classification Search
USPC .......... 361/602, 604, 611, 612, 618, 619, 620
See application file for complete search history.

(56) References Cited

U.S. PATENT DOCUMENTS

| | | | | |
|---|---|---|---|---|
| 3,823,346 A | * | 7/1974 | Olsen | 361/612 |
| 6,624,372 B1 | * | 9/2003 | Ogawa et al. | 218/71 |
| 6,646,861 B1 | * | 11/2003 | Watanabe et al. | 361/612 |
| 7,414,827 B2 | * | 8/2008 | Kashiwa et al. | 361/612 |
| 7,911,770 B2 | * | 3/2011 | Fujita et al. | 361/612 |
| 8,254,088 B2 | * | 8/2012 | Tanaka et al. | 361/604 |

(Continued)

FOREIGN PATENT DOCUMENTS

| | | |
|---|---|---|
| JP | 63-038925 B2 | 8/1988 |
| JP | 05-328547 A | 12/1993 |

(Continued)

OTHER PUBLICATIONS

International Search Report (PCT/ISA/210) issued on Nov. 24, 2009, by Japanese Patent Office as the International Searching Authority for International Application No. PCT/JP2009/067350.

(Continued)

*Primary Examiner* — Gregory Thompson
(74) *Attorney, Agent, or Firm* — Buchanan Ingersoll & Rooney PC

(57) ABSTRACT

A gas insulated switchgear is configured including phase-A, phase-B, and phase-C breaker units. For example, the phase-A breaker unit includes breakers connected in series in a horizontal first direction, disconnectors annexed on the breaker, disconnectors annexed on a breaker, and disconnectors annexed on a breaker. The disconnector is connected to a main bus that extends in the first direction, and the disconnector is connected to a main bus that extends in the first direction. Each of the disconnectors on the breakers is arranged while a longitudinal direction thereof is set to a second direction orthogonal to the first direction so that a switching direction of the disconnector is equal to the second direction. Thereby, the length of the main buses can be shortened, and an interphase distance and a breaker-to-breaker distance can be reduced.

11 Claims, 7 Drawing Sheets

(56) References Cited

U.S. PATENT DOCUMENTS

| | | | |
|---|---|---|---|
| 2005/0141175 A1* | 6/2005 | Chavot et al. | 361/604 |
| 2007/0153449 A1 | 7/2007 | Kashiwa et al. | |
| 2009/0261069 A1* | 10/2009 | Kisanuki et al. | 218/1 |
| 2010/0259870 A1* | 10/2010 | Tanaka et al. | 361/618 |

FOREIGN PATENT DOCUMENTS

| | | |
|---|---|---|
| JP | 11-355923 A | 12/1999 |
| JP | 2002-186124 A | 6/2002 |
| JP | 2007-202390 A | 8/2007 |

OTHER PUBLICATIONS

Written Opinion (PCT/ISA/237) issued on Nov. 24, 2009, by Japanese Patent Office as the International Searching Authority for International Application No. PCT/JP2009/067350.

\* cited by examiner

A-A CROSS SECTION

B-B CROSS SECTION

US 8,605,412 B2

GAS INSULATED SWITCHGEAR

FIELD

The present invention relates to a gas insulated switchgear having three breakers arranged and connected between a pair of main buses.

BACKGROUND

Generally, a gas insulated switchgear is configured with necessary devices such as breakers, disconnectors and main buses disposed in a metal container charged with insulation gas such as SF6 (sulfur hexafluoride) gas, which is excellent in insulating performance and arc-extinguishing performance. The gas insulated switchgear is used in an electric power station such as a transforming station or a power generating station.

Patent Literature 1 describes a so-called 1·½ CB (Circuit Breaker) system gas insulated switchgear having three breakers arranged and connected between a pair of main buses. Specifically, first to third breakers are connected in series between the paired main buses while making axes of the breakers horizontal, and disconnectors are annexed to both sides of an upper portion of each of the breakers, respectively. The disconnectors are arranged to match the longitudinal direction of the disconnectors to match the axial direction of the breakers so that an operating direction of each of the disconnectors is equal to the axial direction of the corresponding breaker. Therefore, the breakers and disconnectors are arranged on one and the same plane. Furthermore, three units each including these three breakers are prepared for three phases, and these units are arranged in a direction orthogonal to the axes of the breakers.

CITATION LIST

Patent Literature

Patent Literature 1: Japanese Patent Application Laid-open No. 2002-186124

SUMMARY

Technical Problem

However, the conventional gas insulated switchgear described in Patent Literature 1 has the following problems. That is, because the breakers and disconnectors are arranged on the same plane, when the main buses are connected, for example, to one of the disconnectors annexed to the first breaker, it is necessary to draw the main buses once in a direction perpendicular to the above-mentioned same plane from the disconnector, then change the drawing direction to the axial direction, and extend the main buses. For this reason, the length of the main buses increases by a length of the part drawn in the direction perpendicular to the same plane and an interphase distance increases accordingly. This results in increase in an installation area for the gas insulated switchgear.

Patent Literature 1 also has the following problem. That is, since each disconnector extends in the axial direction of the corresponding breaker, the distance between the breakers increases by the length of the disconnector, and the length of the main buses increase. This also results in increase in an installation area for the gas insulated switchgear.

The present invention has been achieved in view of the above-mentioned problems, and an object of the present invention is to provide a gas insulated switchgear capable of shortening the length of main buses and reducing an interphase distance and a breaker-to-breaker distance.

Solution to Problem

In order to solve the above-mentioned problems and achieve the object, the present invention provides a gas insulated switchgear comprising a three-phase unit, the three-phase unit including breaker units for three phases, the breaker units being juxtaposed in a second direction that is a horizontal direction, orthogonal to a horizontal, first direction, each of the breaker units including first to third breakers arranged between first and second main buses that extend in the first direction at the same height, the first to third breakers being arranged and connected in series while matching axes of their breaker tanks to one another on the same line parallel to the first direction; and a pair of disconnectors annexed to both sides of an upper portion of each of the breakers, wherein: each of the disconnectors annexed to the first to third breakers is arranged while a longitudinal direction of the disconnector is set to the second direction so that a switching direction of the disconnector is equal to the second direction; one of the disconnectors annexed to the first breaker is connected to the first main bus; the other of the disconnectors annexed to the first breaker is connected to a first line bus and to one of the disconnectors annexed to the second breaker; the other disconnector annexed to the second breaker is connected to a second line bus and to one of the disconnectors annexed to the third breaker; and the other of the disconnectors annexed to the third breaker is connected to the second main bus.

Advantageous Effects of Invention

According to the present invention, the first to third breakers are arranged in series in the first direction, and the disconnectors provided on the first to third breakers are arranged with the longitudinal direction thereof being along the second direction so that the switching direction thereof is along the second direction orthogonal to the first direction. In this way, the invention offers advantageous effects in that the length of the main buses can be shortened, and the interphase distance and the breaker-to-breaker distance can be reduced.

DESCRIPTION OF EMBODIMENTS

Now embodiments of a gas insulated switchgear according to the present invention will be described below in detail with reference to the accompanying drawings. It should be noted that the present invention is not limited to the embodiments.

First embodiment.

Figure 1:
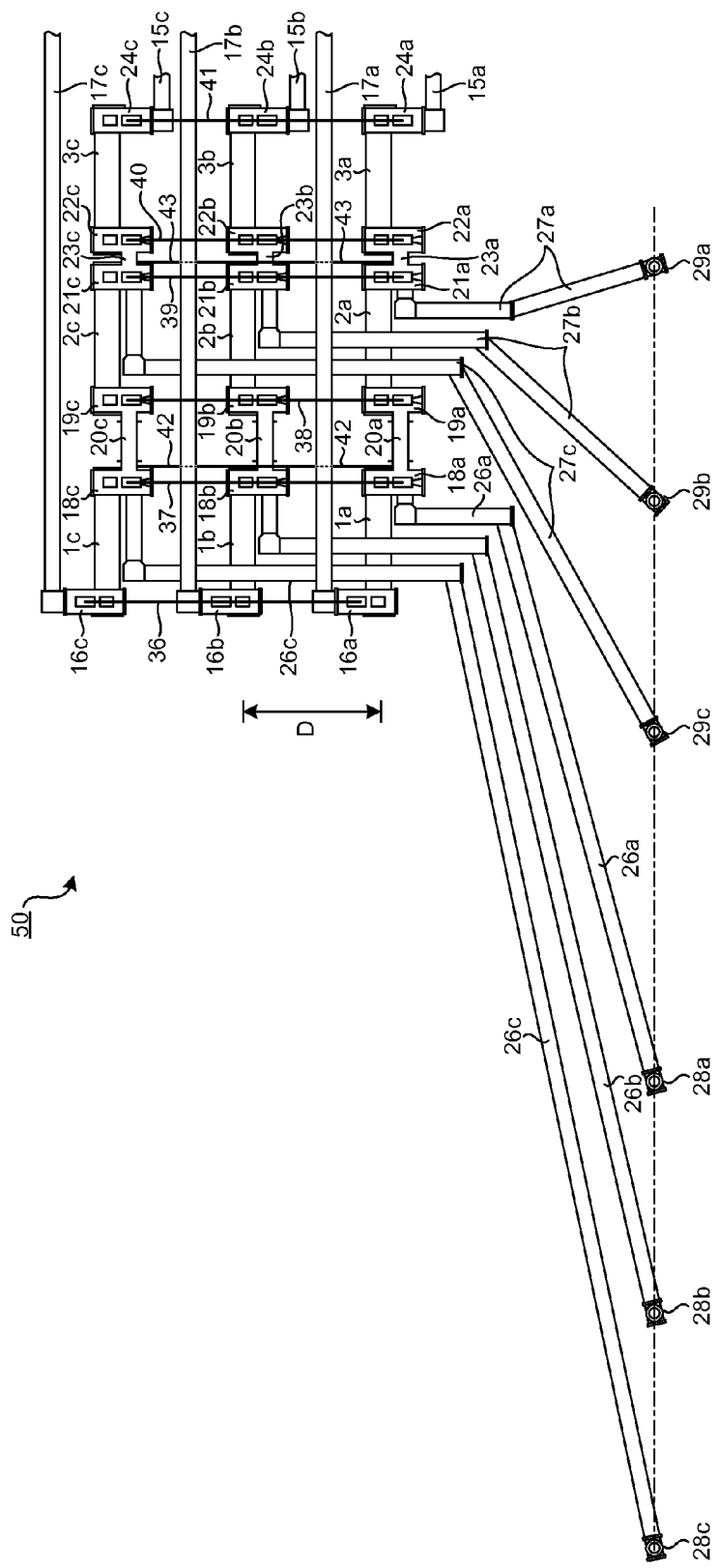
FIG. 1 is a top view of a configuration of a gas insulated switchgear according to a first embodiment.
Figure 2:
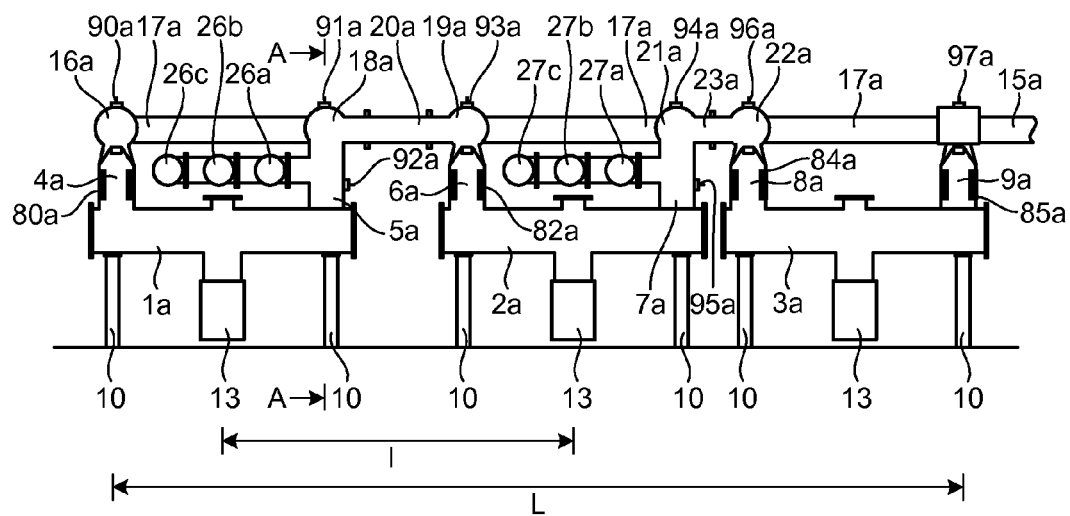
FIG. 2 is a side view of the configuration of the gas insulated switchgear according to the first embodiment.
Figure 3:
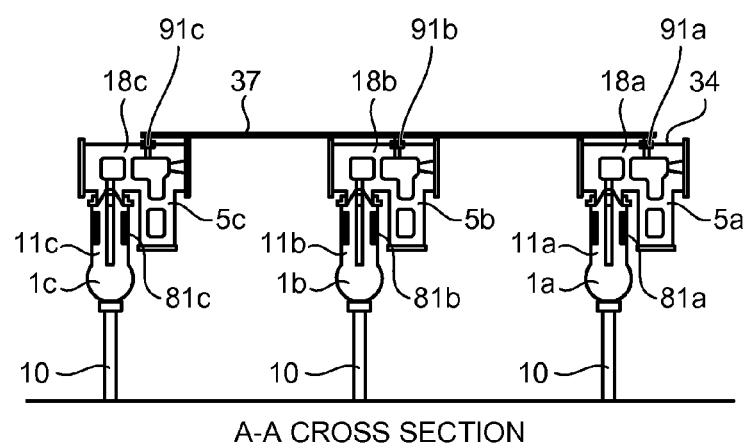
FIG. 3 is a cross-sectional view taken along a line A-A of FIG. 2.

FIG. 1 is a top view of a configuration of a gas insulated switchgear according to the present embodiment, FIG. 2 is a side view of the configuration of the gas insulated switchgear according to the present embodiment, and FIG. 3 is a cross-sectional view taken along a line A-A of FIG. 2. In FIGS. 1 to 3, an internal configuration of the gas insulated switchgear is illustrated partially in a see-through view.

As shown in FIGS. 1 to 3, the gas insulated switchgear according to the present embodiment includes a three-phase unit 50. This three-phase unit 50 includes: a phase-A breaker unit, a phase-B breaker unit and a phase-C breaker unit; phase-A main buses 15a and 17a; phase-A line buses 26a and 27a; phase-B main buses 15b and 17b; phase-B line buses 26b and 27b; phase-C main buses 15c and 17c; phase-C line buses 26c and 27c; air bushings 28a to 28c, for example, provided on tips of the respective line buses 26a to 26c; and air bushings 29a to 29c, for example, provided on tips of the respective line buses 27a to 27c. The main bus 17a, 17b or 17c corresponds to a first main bus, and the main bus 15a, 15b or 15c corresponds to a second main bus. In addition, the line bus 26a, 26b or 26c corresponds to a first line bus, and the line bus 27a, 27b or 27c corresponds to a second line bus.

The phase-A breaker unit includes, as main constituent elements, breakers 1a to 3a, disconnectors 16a, 18a, 19a, 21a, 22a and 24a, and line disconnectors 5a and 7a. The phase-B breaker unit includes, as main constituent elements, breakers 1b to 3b, disconnectors 16b, 18b, 19b, 21b, 22b and 24b, and line disconnectors 5b and 7b. The phase-C breaker unit includes, as main constituent elements, breakers 1c to 3c, disconnectors 16c, 18c, 19c, 21c, 22c and 24c, and line disconnectors 5c and 7c. Thus, breaker units for three phases are juxtaposed.

It is noted that the breakers 1a to 3a, the breakers 1b to 3b, or the breakers 1c to 3c correspond to first to third breakers. The disconnector 16a, 16b or 16c is one of the disconnectors annexed to the first breaker, and the disconnector 18a, 18b or 18c is the other of the disconnectors annexed to the first breaker. The disconnector 19a, 19b or 19c is one of the disconnectors annexed to the second breaker, and the disconnector 21a, 21b or 21c is the other of the disconnectors annexed to the second breaker. The disconnector 22a, 22b or 22c is one of the disconnectors annexed to the third breaker, and the disconnector 24a, 24b or 24c is the other of the disconnectors annexed to the third breaker.

While the phase-A breaker unit is mainly described below, the same applies to the phase-B and phase-C breaker units.

The main buses 15a and 17a that are the paired main buses extend in parallel at a predetermined interval in one horizontal direction (hereinafter, referred to as "first direction"). The same also applies to the main buses 15b and 17b, and 15c and 17c, and all of these main buses extend at the same height.

The three breakers 1a to 3a connected in series are arranged between the main buses 15a and 17a, and each of the breakers 1a to 3a is configured to dispose a breaking unit (not shown) in a breaker tank in form of, for example, a cylinder, charged with insulating arc-extinguishing gas such as SF6 (sulfur hexafluoride) gas. Furthermore, the axes of the breaker tanks are in the same straight line parallel to the first direction, and the three breakers 1a to 3a are arranged in series in the first direction. As can be understood, the breakers 1a to 3a are so-called horizontal breakers arranged with their axes being in the horizontal direction. Operating devices 13 for operating the breakers are provided in lower portions of the breakers 1a to 3a, respectively. The breakers 1a to 3a are placed on trestles 10, respectively. The same also applies to the breakers 1b to 3b and 1c to 3c, and all these breakers are arranged at the same height.

The breaker 1a is of a so-called π (pi) shape, and includes two outlets 4a and 11a on both sides of an upper portion of the breaker 1a, respectively. An instrument current transformer 80a is provided within the outlet 4a. Similarly, an instrument current transformer 81a is provided within the outlet 11a. These instrument current transformers 80a and 81a measure currents flowing to a central conductor (not shown) connected to the breaking unit of the breaker 1a, respectively.

The disconnector 16a, one of the two disconnectors annexed on the breaker 1a, is provided in an upper portion of the outlet 4a. The disconnector 16a is arranged with the longitudinal direction thereof set to a horizontal direction (hereinafter, "second direction") orthogonal to the first direction so that the operating direction (that is, the switching direction) of the disconnector 16a is equal to the second direction. The second direction is also defined as an inter-phase direction. An operating shaft 90a for making operation to open and close the disconnector 16a is provided in an upper portion of the disconnector 16a. The operating shaft 90a protrudes upward. The disconnector 16a includes a grounding switch (not shown).

As shown in FIG. 1, one end of the disconnector 16a is arranged on the breaker 1a, and the other end thereof is drawn toward the phase-B breaker unit along the second direction so that the other end becomes away from the breaker 1a. The main bus 17a is connected to the other end of the disconnector 16a. The main bus 17a is directly connected to the other end of the disconnector 16a in a state of extending in the first direction. In the present embodiment, the main bus 17a is arranged at the same height as that of the disconnector 16a, for example. In the present embodiment, the disconnectors 16a to 16c, 18a to 18c, 19a to 19c, 21a to 21c, 22a to 22c, and 24a to 24c are all arranged at the same height, and the main buses 15a to 15c and 17a to 17c are also arranged at the same height as that of the disconnectors. However, the present invention is not limited to examples of this embodiment in respect of the relation between the arrangement height of the disconnectors and that of the main buses.

Meanwhile, the disconnector 18a, the other of the two disconnectors annexed on the breaker 1a, is provided in an upper portion of the outlet 11a. The disconnector 18a, as with the disconnector 16a, is arranged with the longitudinal direction thereof set to the second direction so that the operating direction of the disconnector 18a is equal to the second direction. An operating shaft 91a for making operation to open and close the disconnector 18a is provided in an upper portion of the disconnector 18a. The operating shaft 91a protrudes upward. The disconnector 18a includes a grounding switch (not shown).

As shown in FIG. 1, one end of the disconnector 18a is arranged on the breaker 1a, and the other end thereof is drawn toward a side opposite to the phase-B breaker unit along the second direction so that the other end becomes away from the breaker 1a. The line disconnector 5a is provided in a lower portion of the other end of the disconnector 18a, for example. In this way, the line disconnector 5a is connected to the lower portion of the disconnector 18a. Accordingly, a disconnector tank 34 that concurrently includes the disconnector 18a and the line disconnector 5a is formed into a generally T-shape, as shown in FIG. 3. An operating shaft 92a for operating the line disconnector 5a is provided on a side surface of the line disconnector 5a closer to the breaker 2a. The operating shaft 92a protrudes laterally. Such a structure also applies to the disconnectors 18b and 18c. The line disconnector 5a, 5b or 5c corresponds to a first line disconnector.

The line bus 26a is connected to the line disconnector 5a, and is located between the breaker 1a and the main bus 17a in a height direction (FIG. 2). The line bus 26a is drawn from between the disconnectors 16a and 18a. This relation also applies to the other line buses 26b, 26c, and 27a to 27c, and each line bus is located between a breaker and a main bus in the height direction, and is drawn from between the corresponding disconnectors. After the line bus 26b is drawn once in the first direction from the line disconnector 5b provided in a lower portion of the disconnector 18b in the phase-B breaker unit, the drawing direction of the line bus 26b changes to the second direction, the line bus 26b passes below the main bus 17a and passes above the breaker 1a. Furthermore, after the line bus 26c is drawn once in the first direction from the line disconnector 5c provided in a lower portion of the disconnector 18c in the phase-C breaker unit, the drawing direction of the line bus 26c changes to the second direction, the line bus 26c passes below the main bus 17b, passes above the breaker 1b, passes below the main bus 17a, and then passes above the breaker 1a.

The breaker 2a is described next. The breaker 2a is likewise of a π-shape, and includes two outlets on both sides of an upper portion of the breaker 2a, respectively. In FIG. 2, an outlet 6a that is one of the two outlets is shown, but the other outlet is not shown and not denoted by any reference sign because the other outlet hides behind the line disconnector 7a. An instrument current transformer 82a is provided within the outlet 6a. Similarly, an instrument current transformer (not shown) is provided within the other outlet (not shown). These instrument current transformers measure currents flowing to a central conductor (not shown) connected to a breaking unit of the breaker 2a, respectively.

The disconnector 19a, one of the two disconnectors annexed on the breaker 2a, is provided in an upper portion of the outlet 6a. The disconnector 19a is arranged with the longitudinal direction thereof set to the second direction so that the operating direction of the disconnector 19a is equal to the second direction. An operating shaft 93a for making operation to open and close the disconnector 19a is provided in an upper portion of the disconnector 19a. The operating shaft 93a protrudes upward. The disconnector 19a includes a grounding switch (not shown).

As shown in FIG. 1, one end of the disconnector 19a is arranged on the breaker 2a, and the other end thereof is drawn toward the side opposite to the phase-B breaker unit along the second direction so that the other end becomes away from the breaker 2a. The other end of the disconnector 19a is connected to the other end of the disconnector 18a described above by a bellows 20a that stretches in the first direction, for example. The bellows 20a has an effect of absorbing and relaxing vibrations applied to the gas insulated switchgear. A connection tank may replace the bellows 20a to connect the disconnector 18a to the disconnector 19a.

Meanwhile, the disconnector 21a, the other of the two disconnectors annexed on the breaker 2a, is provided in an upper portion of the other outlet (not shown) on the breaker 2a. The disconnector 21a, as with the disconnectors 16a and the like, is arranged with the longitudinal direction thereof set to the second direction so that the operating direction of the disconnector 21a is equal to the second direction. An operating shaft 94a for making operation to open and close the disconnector 21a is provided in an upper portion of the disconnector 21a. The operating shaft 94a protrudes upward. The disconnector 21a includes a grounding switch (not shown).

As shown in FIG. 1, one end of the disconnector 21a is arranged on the breaker 2a, and the other end thereof is drawn toward the side opposite to the phase-B breaker unit along the second direction so that the other end becomes away from the breaker 2a. The line disconnector 7a is provided in a lower portion of the other end of the disconnector 21a. The disconnector 21a and the line disconnector 7a are contained in a disconnector tank similar in shape to the disconnector tank 34 shown in FIG. 3. An operating shaft 95a for operating the line disconnector 7a is provided on a side surface of the line disconnector 7a closer to the breaker 3a. The operating shaft 95a protrudes laterally. Such a structure also applies to the disconnectors 21b and 22c. The line disconnector 7a connected to the lower portion of the disconnector 21a, a line disconnector (not shown) connected to a lower portion of the disconnector 21b, or a line disconnector (not shown) connected to a lower portion of the disconnector 21c corresponds to a second line disconnector.

The line bus 27a is connected to the line disconnector 7a, and is located between the breaker 2a and the main bus 17a in the height direction (FIG. 2) as described above. The line bus 27a is drawn from between the disconnectors 19a and 21a. After the line bus 27b is drawn once in the first direction from the line disconnector (not shown) provided in a lower portion of the disconnector 21b in the phase-B breaker unit, the drawing direction of the line bus 27b changes to the second direction, the line bus 27b passes below the main bus 17a, and then passes above the breaker 2a. Furthermore, after the line bus 27c is drawn once in the first direction from the line disconnector (not shown) provided in a lower portion of the disconnector 21c in the phase-C breaker unit, the drawing direction of the line bus 27c changes to the second direction, the line bus 27c passes below the main bus 17b, passes above the breaker 2b, passes below the main bus 17a, and then passes above the breaker 2a.

The breaker 3a is described next. The breaker 3a is likewise of a π-shape, and includes two outlets 8a and 9a on both sides of an upper portion of the breaker 3a, respectively. An instrument current transformer 84a is provided within the outlet 8a. Similarly, an instrument current transformer 85a is provided within the outlet 9a. These instrument current transformers 84a and 85a measure currents flowing to a central conductor (not shown) connected to a breaking unit of the breaker 3a, respectively.

The disconnector 22a, one of the two disconnectors annexed on the breaker 3a, is provided in an upper portion of the outlet 8a. The disconnector 22a is arranged with the longitudinal direction thereof set to the second direction so that the operating direction of the disconnector 22a is equal to the second direction. An operating shaft 96a for making operation to open and close the disconnector 22a is provided in an upper portion of the disconnector 22a. The operating shaft 96a protrudes upward. The disconnector 22a includes a grounding switch (not shown).

As shown in FIG. 1, one end of the disconnector 22a is arranged on the breaker 3a, and the other end thereof is drawn toward the side opposite to the phase-B breaker unit along the second direction so that the other end becomes away from the breaker 3a. The other end of the disconnector 22a is connected to the other end of the disconnector 21a described above by a connection tank 23a that extends in the first direction, for example. A bellows may replace the connection tank 23a to connect the disconnector 21a to the disconnector 22a. The connection tank 23a is shorter than the bellows 20a.

Meanwhile, the disconnector 24a, the other of the two disconnectors annexed on the breaker 3a, is provided in an upper portion of the other outlet 9a on the breaker 3a. The disconnector 24a, as with the disconnectors 16a and the like, is arranged with the longitudinal direction thereof set to the second direction so that the operating direction of the disconnector 24a is equal to the second direction. An operating shaft 97a for making operation to open and close the disconnector 24a is provided in an upper portion of the disconnector 24a. The operating shaft 97a protrudes upward. The disconnector 24a includes a grounding switch (not shown).

As shown in FIG. 1, one end of the disconnector 24a is arranged on the breaker 3a, and the other end thereof is drawn toward the side opposite to the phase-B breaker unit along the second direction so that the other end becomes away from the breaker 3a. The main bus 15a is connected to the other end of the disconnector 24a. The main bus 15a is directly connected to the other end of the disconnector 24a in a state of extending in the first direction.

As shown in FIG. 1, on a connection path that covers, for example, the breaker 1a, the disconnector 18a, the bellows 20a, the disconnector 19a, the breaker 2a, the disconnector 21a, the connection tank 23a, the disconnector 22a, the breaker 3a and the disconnector 24a, an axis of the bellows 20a (or the connection tank 23a) shifts to the side opposite to the phase-B breaker unit by a certain distance with respect to the axes of the breakers 1a to 3a. In other words, the drawing direction of the disconnectors 18a, 19a, 21a and 22a are made equal to the drawing direction of the line buses 26a to 26c and 27a to 27c.

Furthermore, the breaker 1a, the bellows 20a, the breaker 2a, the connection tank 23a and the breaker 3a are arranged alternately on a straight line including the axis of the breaker 1a and a straight line including the axis of the bellows 20a.

In the present embodiment, the disconnectors 18a, 19a, 21a and 22a are drawn toward the side opposite to the phase-B breaker unit. Alternatively, these disconnectors can be drawn toward the phase-B breaker unit. In this case, the axis of the bellows 20a (or the connection tank 23a) shifts toward the phase-B breaker unit by a certain distance with respect to the axes of the breakers 1a to 3a.

The configuration of the phase-A breaker unit has been described above in detail. Breaker units for three phases each having a configuration described above are juxtaposed in the second direction.

Figure 9:
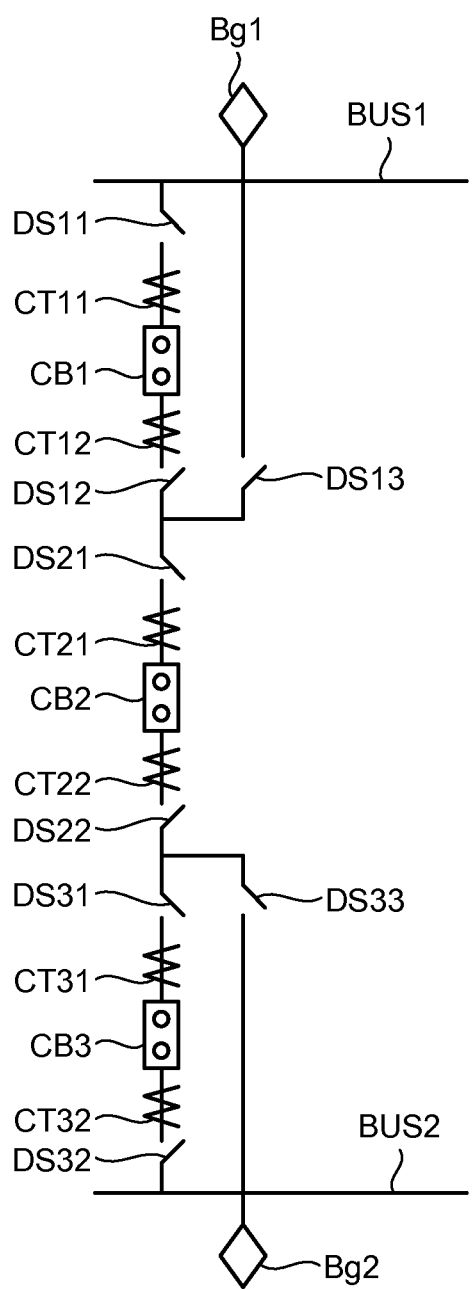
FIG. 9 is a single line connecting diagram of a breaker unit in the first embodiment.

FIG. 9 is a single line connection diagram of a breaker unit according to the present embodiment. This single line connection diagram represents each of the phase-A, phase-B and phase-C breaker units. For example, if FIG. 9 represents the phase-A breaker unit, a main bus BUS1 corresponds to the main bus 17a, a disconnector DS11 corresponds to the disconnector 16a, an instrument current transformer CT11 corresponds to the instrument current transformer 80a, a breaker CB1 corresponds to the breaker 1a, an instrument current transformer CT12 corresponds to the instrument current transformer 81a, a disconnector DS12 corresponds to the disconnector 18a, a line disconnector DS13 corresponds to the line disconnector 5a, an air bushing Bg1 corresponds to the air bushing 28a, a disconnector DS21 corresponds to the disconnector 19a, an instrument current transformer CT21 corresponds to the instrument current transformer 82a, a breaker CB2 corresponds to the breaker 2a, an instrument current transformer CT22 corresponds to the other instrument current transformer (not shown) of the breaker 2a, a disconnector DS22 corresponds to the disconnector 22a, a line disconnector DS33 corresponds to the line disconnector 7a, an air bushing Bg2 corresponds to the air bushing 29a, a disconnector DS31 corresponds to the disconnector 22a, an instrument current transformer CT31 corresponds to the instrument current transformer 84a, a breaker CB3 corresponds to the breaker 3a, an instrument current transformer CT32 corresponds to the instrument current transformer 85a, a disconnector DS32 corresponds to the disconnector 24a, and a main bus BUS2 corresponds to the main bus 15a.

As shown in FIG. 9, the three breakers CB1, CB2 and CB3 are electrically connected in series between the main buses BUS1 and BUS2.

The disconnectors DS11 and DS12 are connected to both sides of the breaker CB1, respectively. The instrument current transformer CT11 is connected between the breaker CB1 and the disconnector DS11, and the instrument current transformer CT12 is connected between the breaker CB1 and the disconnector DS12.

Similarly, the disconnectors DS21 and DS22 are connected to both sides of the breaker CB2, respectively. The instrument current transformer CT21 is connected between the breaker CB2 and the disconnector DS21, and the instrument current transformer CT22 is connected between the breaker CB2 and the disconnector DS22.

Similarly, the disconnectors DS31 and DS32 are connected to both sides of the breaker CB3, respectively. The instrument current transformer CT31 is connected between the breaker CB3 and the disconnector DS31, and the instrument current transformer CT32 is connected between the breaker CB3 and the disconnector DS32.

The air bushing Bg1 is connected to a point between the disconnectors DS12 and DS21 via the line disconnector DS13. Likewise, the air bushing Bg2 is connected to a point between the disconnectors DS22 and DS31 via the line disconnector DS33.

Operation connecting rods 36 to 43 are described next. While the operating shaft 90a is provided on the disconnector 16a as described above, operating shafts (not shown) are also provided in equivalent locations on the disconnectors 16b and 16c, respectively. The operation connecting rod 36 (first operation connecting rod) extends in the second direction to be connected to the operating shafts of the disconnectors 16a to 16c, and can collectively operate the disconnectors for three phases. At this time, the operation connecting rod 36 can be easily connected to the operating shafts of the disconnectors 16a to 16c because the operating shafts protrude upward out of the respective breakers. The same also applies to the disconnectors 18a to 18c. The operation connecting rod 37 (second operation connecting rod) extends in the second direction to be connected to the operating shaft 91a on the disconnector 18a, the operating shaft 91b on the disconnector 18b and the operating shaft 91c on the disconnector 18c, and can collectively operate the disconnectors 18a to 18c (FIG. 3). Similarly, the operation connecting rod 38 (third operation connecting rod), the operation connecting rod 39 (fourth operation connecting rod), the operation connecting rod 40 (fifth operation connecting rod) and the operation connecting rod 41 (sixth operation connecting rod) can collectively operate the disconnectors 19a to 19c, 21a to 21c, 22a to 22c, and 24a to 24c, respectively.

An operation connecting rod 42 (seventh operation connecting rod) extends in the second direction to be connected to the operating shafts (the operating shaft 92a etc.) of the line disconnectors connected to the lower portions of the disconnectors 18a to 18c, and can collectively operate the line disconnectors for three phases. The operation connecting rod 42 is connected to side surfaces of the line disconnectors or, to be specific, arranged on the side of the disconnectors 19a to 19c. The operation connecting rod 42 is arranged at the height between the breakers 1a to 1c and the disconnectors 18a to 18c. The same also applies to an operation connecting rod 43 (eighth operation connecting rod). The operation connecting rod 43 is connected to the operating shafts (the operating shaft 95a etc.) of the line disconnectors connected to the lower portions of the disconnectors 21a to 21c, and can collectively operate the line disconnectors for three phases.

As shown in FIG. 1, the air bushings 28a to 28c and 29a to 29b are arranged at even intervals, for example. After being drawn from the breaker units for three phases in the second direction, the line buses 26a to 26c and 27a to 27c extend along predetermined directions according to locations of the air bushings 28a to 28c and 29a to 29c, respectively. In the present embodiment, the line buses 26a to 26c and 27a to 27c are drawn toward the side opposite to the phase-B breaker unit when viewed from the phase-A breaker unit. Alternatively, the line buses 26a to 26c and 27a to 27c may be drawn toward the phase-B breaker unit.

As described above, in the present embodiment, the first to third breakers (the breakers 1a to 3a, 1b to 3b, or 1c to 3c) are arranged in series in the first direction, and the disconnectors annexed on the first to third breakers are arranged with the longitudinal direction thereof set to the second direction orthogonal to the first direction so that the switching direction of the disconnectors is equal to the second direction. With this configuration, the one disconnector (16a, 16b or 16c), one of the disconnectors annexed on the first breaker, is drawn in the second direction. This makes it unnecessary to provide any extra main bus tank and draw the first main bus (17a, 17b or 17c) in the second direction and makes it possible to directly connect the first main bus that extends in the first direction, to the one disconnector, when the first main bus is to be connected to the disconnector (16a, 16b or 16c). The same also applies to the second main bus (15a, 15b or 15c). Therefore, as compared with the configuration disclosed in Patent Literature 1, the configuration according to the present embodiment can facilitate drawing the first and second main buses, shorten the lengths of the main buses, reduce an interphase distance D (FIG. 1), and eventually reduce the installation area of the gas insulated switchgear.

According to the present embodiment, the disconnectors annexed on the first to third breakers are arranged with the longitudinal direction thereof set to the second direction. Therefore, each disconnector is arranged on the corresponding breaker with respect to the first direction, and the length of the bellows 20a or that of the connection tank 23a substantially determines a breaker-to-breaker distance I (FIG. 2). For this reason, the breaker-to-breaker distance does not increase by the length of each disconnector unlike the configuration disclosed in Patent Literature 1. Accordingly, it is possible to shorten the breaker-to-breaker distance I or a bus length L (FIG. 2), and so eventually reduce the installation area of the gas insulated switchgear.

The breaker unit for each phase according to the present embodiment is a 1·½ CB (Circuit Breaker) system unit. The 1·½ CB system is a system designed to bring no influence of the main buses on a system even in trouble of the main buses by use of the three disconnectors for drawing two lines, and designed to take it into consideration not to require shutoff of the lines during the checkup of the breakers or the like.

According to the present embodiment, the operating shafts of, for example, the disconnectors 16a, 16b and 16c for three phases are directed in the same direction, protrude upward, and are arranged on the same plane. Therefore, the single operation connecting rod 36 can easily connect these operation shafts together. This can simplify a connection mechanism for collectively operating the disconnectors for three phases. The same effect can be achieved by the operation connecting rods 37 to 43.

In Patent Literature 1, because the operating direction of a disconnector is equal to the axial direction of the breaker, the operating shaft of the disconnector is directed in the interphase direction, but the disconnectors for the respective phases are arranged in the interphase direction. Accordingly, if the disconnectors for three phases are collectively operated, then the main bodies of the disconnectors for the respective phases hamper the connection between the operating devices and the operating shafts of the disconnectors for the respective phases. To overcome this problem, it had been necessary to interpose an intermediate connection mechanism between the operating device and each operating shaft, to prevent each disconnector main body from hampering the connection between the operating device and the operating shaft in the interphase direction by, for example, once drawing out each operating shaft above the disconnector by means of the intermediate connection mechanism, and after that to connect the operating device to the operating shaft. This configuration has a problem that it requires a complicated connection mechanism.

According to the present embodiment, the line buses 26a to 26c and 27a to 27c extend at a height between the height of the breakers 1a to 1c and that of the main buses 17a to 17c or 15a to 15c, and the main buses are set equal in height to the disconnectors. Therefore, the installation height of each of the breakers and the length of each of the disconnectors annexed on the breaker in the height direction thereof determine a height of the entire unit. This makes it possible to make low-rise arrangement of the gas insulated switchgear.

According to the present embodiment, line buses, for example, the line buses 26a to 26c are arranged between the two disconnectors annexed on the first breakers (1a to 1c) or, to be specific, between the paired outlets. Therefore, it leads to effective use of the spaces formed between the first breakers and the respective disconnectors by the outlets, thereby preventing the interphase distance and the breaker-to-breaker distance from increasing. This also applies to the line buses 27a to 27c.

According to the present embodiment, each of the other-side disconnectors (18a to 18c) annexed on the first breakers, the one-side disconnectors (19a to 19c) annexed on the second breakers, the other-side disconnectors (21a to 21c) annexed on the second breakers, and the one-side disconnectors (22a to 22c) annexed on the third breakers has one end arranged on the axis of the first to third breakers and the other end drawn toward one side (the side opposite to the phase-B breaker unit with respect to the phase-A breaker unit) in the second direction with respect to the axis of the first to third breakers. In addition, the line buses 26a to 26c and 27a to 27c are also drawn toward the one side. This can shorten the length of the line buses in the second direction.

According to the present embodiment, the disconnectors 18a and 19a are connected to each other by the bellows 20a, for example. Therefore, vibrations generated when each of the breakers operates or those generated by an earthquake can be absorbed and relaxed.

According to the present embodiment, a space is formed between the installation surface of the gas insulated switchgear and each of the breakers because each breaker is mounted on the trestle 10. The operating device 13 for each breaker is arranged in the lower portion of the breaker while utilizing this space. This can realize the economic arrangement of the operating devices 13.

Second embodiment.

Figure 4:
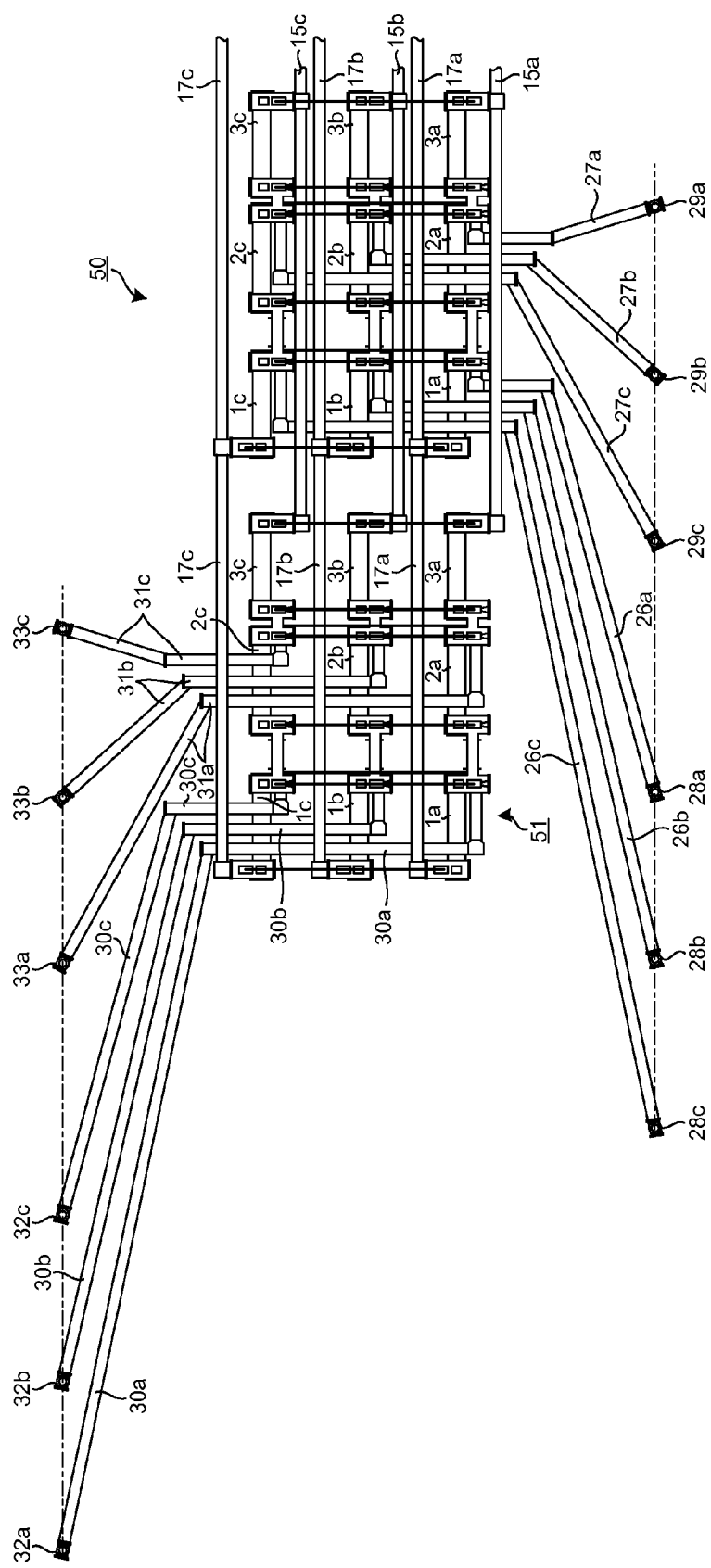
FIG. 4 is a top view of a configuration of a gas insulated switchgear according to a second embodiment.

FIG. 4 is a top view of a configuration of a gas insulated switchgear according to this embodiment. As shown in FIG. 4, the gas insulated switchgear according to the present embodiment includes two adjacent three-phase units 50 and 51. The three-phase unit 50 is the same as that described in the first embodiment except for the connection configuration of the main buses 15a to 15c and 17a to 17c. The three-phase unit 51 includes the same breaker units as those of the three-phase unit 50. Furthermore, the breaker units of the three-phase unit 51 are arranged in the same manner as in the three-phase unit 50. The three-phase unit 51 shares the main buses 15a to 15c and 17a to 17c with the three-phase unit 50.

A difference between the three-phase unit 51 and the three-phase unit 50 is a difference in direction of drawing line buses. That is, the drawing direction of the line buses 26a to 26c and 27a to 27c of the three-phase unit 50 is opposite to that of line buses 30a to 30c and 31a to 31c of the three-phase unit 51 in the second direction defined in the first embodiment. For example, air bushings 32a to 32c are connected to tips of the line buses 30a to 30c, respectively, and air bushings 33a to 33c, for example, are connected to tips of the line buses 31a to 31c, respectively. Intervals of the air bushing 32a to 32c or 33a to 33c are equal to each other, for example.

According to the present embodiment, the drawing directions of the line buses are opposite to each other between the adjacent three-phase units 50 and 51. This makes it unnecessary to secure a unit-to-unit distance in order to avoid the collisions of the line buses of the two units unlike the case of making the drawing directions equal. Therefore, the length of the main buses can be shortened.

The same holds true for the case of providing three or more three-phase units, and the same effects can be achieved by configuring the gas insulated switchgear such that the drawing directions of the line buses are opposite to each other between the adjacent three-phase units in the second direction.

Third embodiment.

Figure 5:
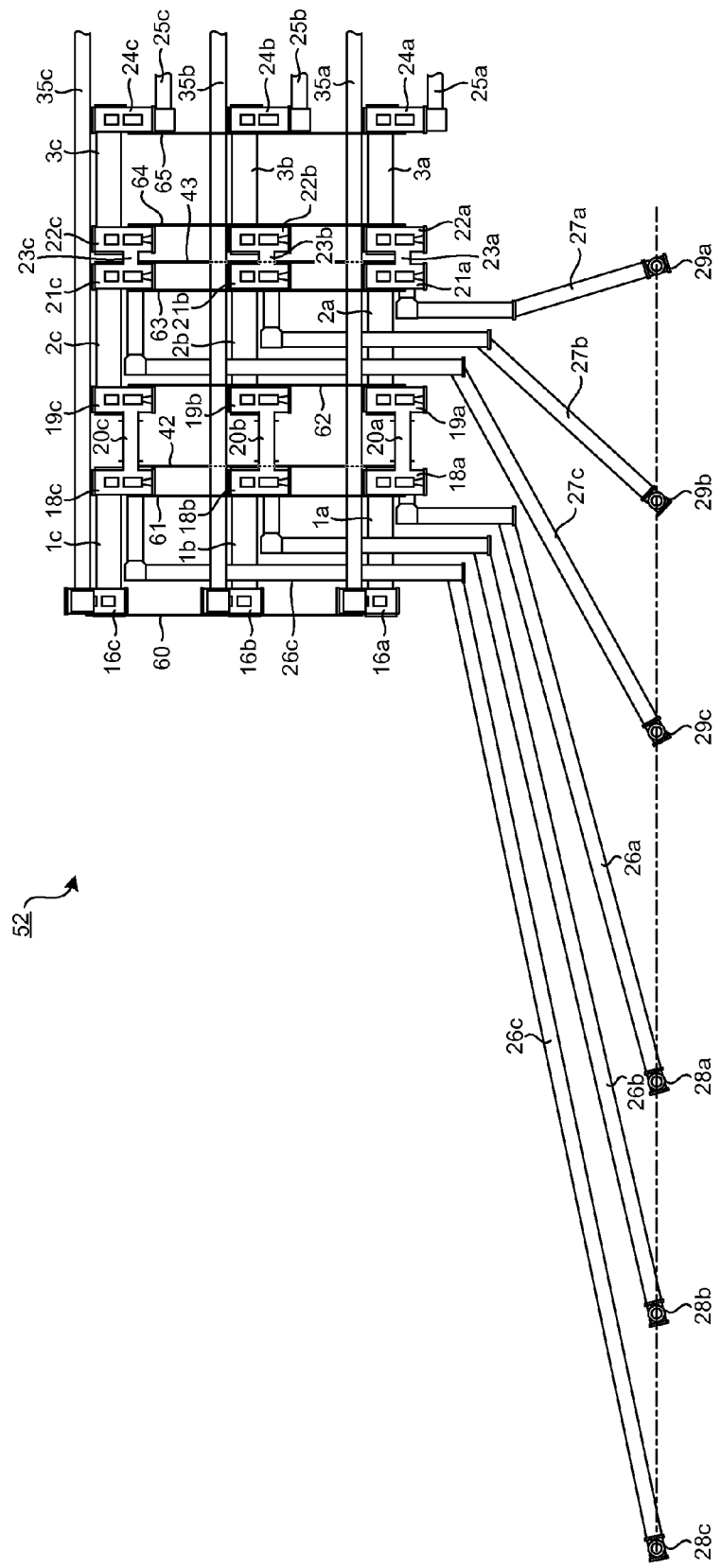
FIG. 5 is a top view of a configuration of a gas insulated switchgear according to a third embodiment.
Figure 6:
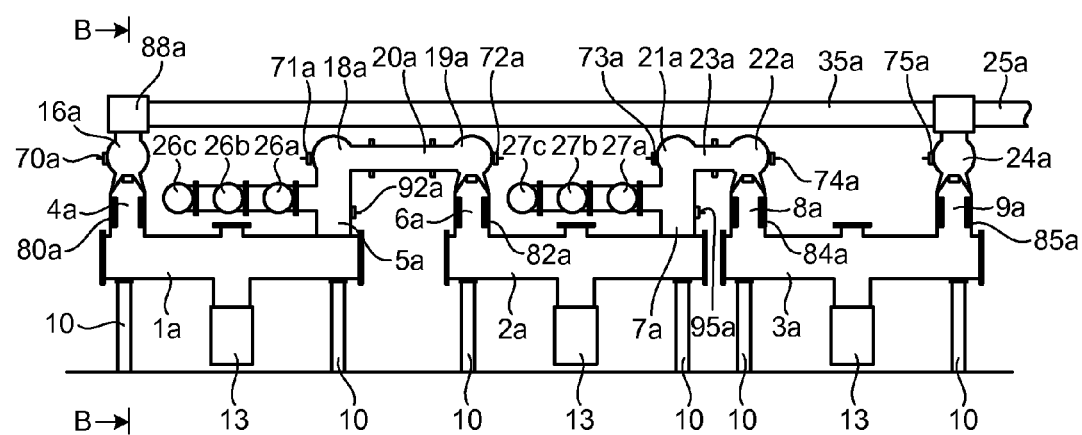
FIG. 6 is a side view of the configuration of the gas insulated switchgear according to the third embodiment.
Figure 7:
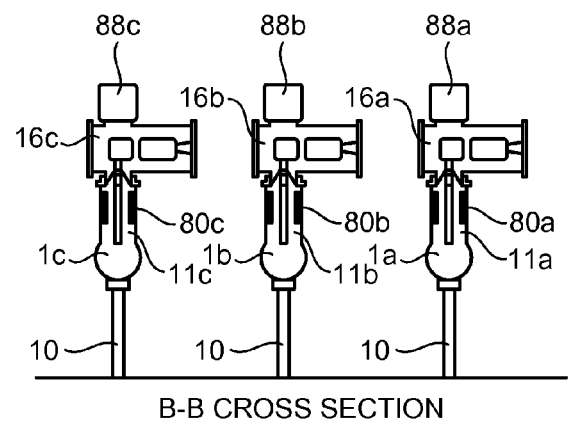
FIG. 7 is a cross-sectional view taken along a line B-B of FIG. 6.

FIG. 5 is a top view of a configuration of a gas insulated switchgear according to this embodiment of, FIG. 6 is a side view of the configuration of the gas insulated switchgear according to the present embodiment, and FIG. 7 is a cross-sectional view taken along a line B-B of FIG. 6. FIGS. 5 to 7 show an internal configuration of the gas insulated switchgear partially in a see-through view. In addition, in FIG. 5 to FIG. 7, constituent elements identical with those shown in FIG. 1 to FIG. 3 are denoted by the same reference signs. In the following descriptions, differences from FIGS. 1 to 3 are mainly described.

The gas insulated switchgear according to the present embodiment includes a three-phase unit 52. This three-phase unit 52 includes a phase-A breaker unit, a phase-B breaker unit, a phase-C breaker unit, phase-A main buses 25a and 35a, the phase-A line buses 26a and 27a, phase-B main buses 25b and 35b, the phase-B line buses 26b and 27b, phase-C main buses 25c and 35c, the phase-C line buses 26c and 27c, the air bushings 28a to 28c, for example, provided on tips of the line buses 26a to 26c, and the air bushings 29a to 29c, for example, provided on tips of the line buses 27a to 27c. The phase-A, phase-B, and phase-C breaker units are not described here because they have the same configuration as that shown in FIGS. 1 to 3.

In the present embodiment, the main buses 25a to 25c and 35a to 35c that extend in the first direction (defined in the first embodiment) at the same height are provided. The main buses 25a to 25c and 35a to 35c, however, differ in installation position from the main buses 15a to 15c and 17a to 17c according to the first embodiment.

For example, the main bus 35a is arranged on the disconnector 16a provided on the breaker 1a (FIGS. 6 and 7). More specifically, one end of the disconnector 16a is arranged on the breaker 1a, and the other end thereof is drawn toward the phase-B breaker unit along the second direction (defined in the first embodiment) so that the other end becomes away from the breaker 1a (FIG. 5). The main bus 35a is connected to an upper portion of the other end of this disconnector 16a. The main bus 35a is directly connected to the other end of the disconnector 16a in a state of extending in the first direction. In the first embodiment, the main bus 17a is connected to the disconnector 16a at the same height as that of the disconnector 16a.

For example, the main bus 25a is arranged on the disconnector 24a provided on the breaker 1a (FIG. 6). More specifically, one end of the disconnector 24a is arranged on the breaker 1a, and the other end thereof is drawn toward the side opposite to the phase-B breaker unit along the second direction so that the other end becomes away from the breaker 1a (FIG. 5). The main bus 25a is connected to an upper portion of the other end of this disconnector 24a. The main bus 25a is directly connected to the other end of the disconnector 24a in a state of extending in the first direction. In the first embodiment, the main bus 15a is connected to the disconnector 24a at the same height as that of the disconnector 24a.

The same holds true for the phase-B main buses 25b and 35b and the phase-C main buses 25c and 35c. FIG. 7 shows a state where main bus connectors 88a to 88c that are one-end portions of the main buses 35a to 35c are arranged on the disconnectors 16a to 16c, respectively.

In the present embodiment, operating shafts of the respective disconnectors differ in installation location from those in the first embodiment, because the main buses 25a to 25c and 35a to 35c are provided in upper portions of the respective disconnectors. Referring to a phase A, for example, an operating shaft 70a for making operation to open and close the disconnector 16a is provided on a side surface of the disconnector 16a. The operating shaft 70a protrudes laterally. An operating shaft 71a for making operation to open and close the disconnector 18a is provided on a side surface of the disconnector 18a. The operating shaft 71a protrudes laterally. An operating shaft 72a for making operation to open and close the disconnector 19a is provided in the upper portion of the disconnector 19a. The operating shaft 72a protrudes laterally. An operating shaft 73a for making operation to open and close the disconnector 21a is provided on a side surface of the disconnector 21a. The operating shaft 73a protrudes laterally. An operating shaft 74a for making operation to open and close the disconnector 22a is provided on a side surface of the disconnector 22a. The operating shaft 74a protrudes laterally. An operating shaft 75a for making operation to open and close the disconnector 24a is provided on a side surface of the disconnector 24a. The operating shaft 75a protrudes laterally. The operating shafts of the line disconnectors 5a and 7a are installed in the same locations as those according to the first embodiment.

Operation connecting rods 60 to 65 are described next. While the operating shaft 70a is provided on the side surface of the disconnector 16a as described above, operating shafts (not shown) are also provided in equivalent locations on side surfaces of the disconnectors 16b and 16c, respectively. The operation connecting rod 60 (first operation connecting rod) extends in the second direction, and is connected to the operating shafts of the disconnectors 16a to 16c, so that it can collectively operate the disconnectors for three phases. At this point, the operation connecting rod 60 can be easily connected to the operating shafts of the disconnectors 16a to 16c because the operating shafts protrude laterally of the respective disconnectors 16a to 16c. This also applies to the disconnectors 18a to 18c. The operation connecting rod 61 (second operation connecting rod) extends in the second direction, and is connected to the operating shafts of the disconnectors 18a to 18c, so that it can collectively operate the disconnectors 18a to 18c. Similarly, the operation connecting rod 62 (third operation connecting rod), the operation connecting rod 63 (fourth operation connecting rod), the operation connecting rod 64 (fifth operation connecting rod), and the operation connecting rod 65 (sixth operation connecting rod) can collectively operate the disconnectors 19a to 19c, the disconnectors 21a to 21c, the disconnectors 22a to 22c, and the disconnectors 24a to 24c, respectively. The operation connecting rod 42 (seventh operation connecting rod) and the operation connecting rod 43 (eighth operation connecting rod) are in the same manner as in the case of the first embodiment.

According to the present embodiment, the main buses 35a to 35c (first main buses) are arranged in upper portions of the disconnectors 16a to 16c annexed to the breakers 1a to 1c (first breakers), respectively, and further, the main buses 25a to 25c (second main buses) are arranged in upper portions of the disconnectors 24a to 24c annexed to the breakers 3a to 3c (third breakers), respectively, so that the interphase distance can be shortened. This can make the installation area of the gas insulated switchgear smaller than in the first embodiment.

Furthermore, according to the present embodiment, the operation connecting rods 60 to 65 can be easily installed because the installation locations thereof are in the side surfaces of the disconnectors 16a to 16c and the like. Other effects of the present embodiment are nearly identical to those of the first embodiment.

Fourth embodiment.

Figure 8:
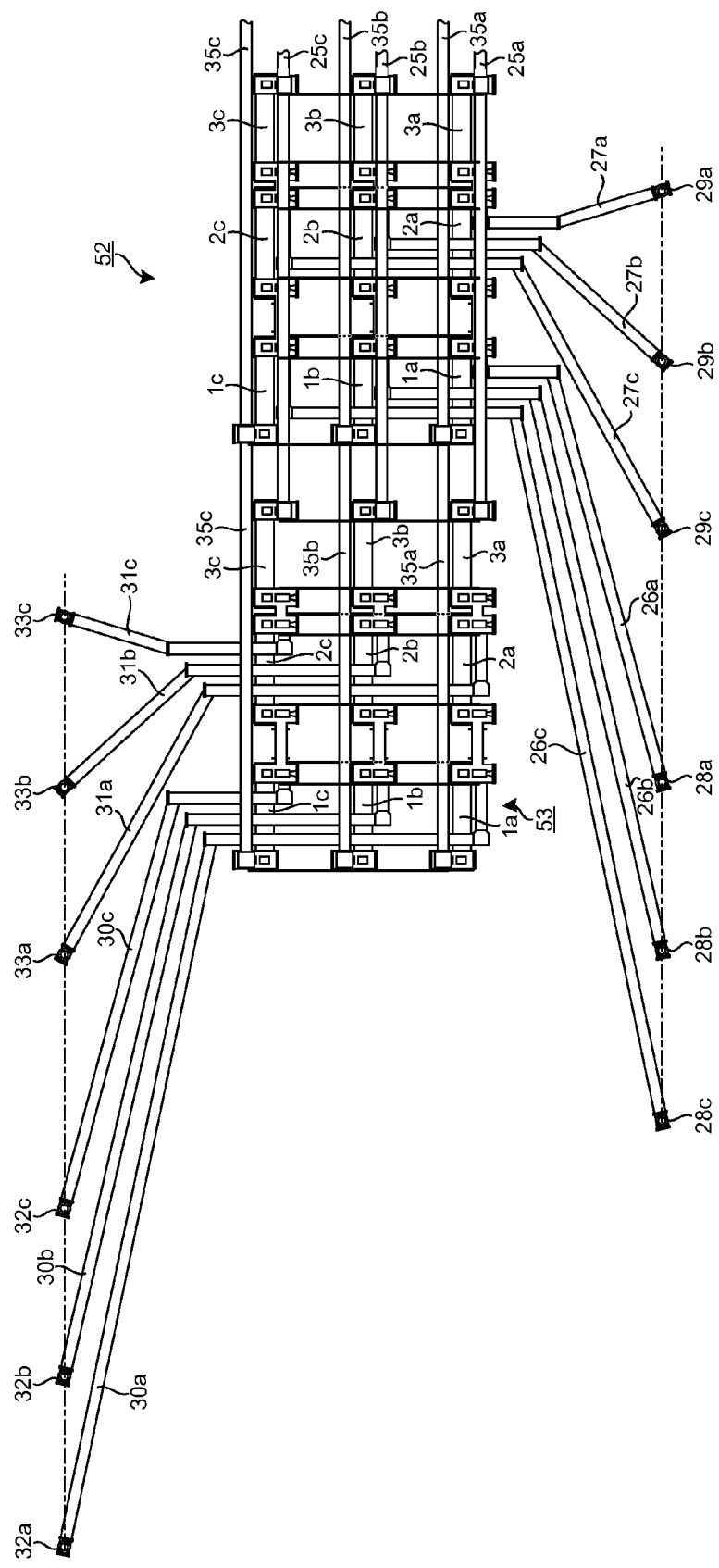
FIG. 8 is a top view of a configuration of a gas insulated switchgear according to a fourth embodiment.

FIG. 8 is a top view of a configuration of a gas insulated switchgear according to this embodiment. As shown in FIG. 8, the gas insulated switchgear according to the present embodiment includes two adjacent three-phase units 52 and 53. The three-phase unit 52 is in the same manner as that described in the third embodiment except for the connection configuration of the main buses 25a to 25c and 35a to 35c. The three-phase unit 53 includes breaker units identical with those of the three-phase unit 52. Furthermore, the breaker units of the three-phase unit 53 are arranged in the same manner as in the three-phase unit 52. The three-phase unit 53 shares the main buses 25a to 25c and 35a to 35c with the three-phase unit 52.

A difference between the three-phase unit 53 and the three-phase unit 52 is a difference in direction of drawing a line bus. That is, the drawing direction of the line buses 26a to 26c and 27a to 27c of the three-phase unit 52 is opposite to that of the line buses 30a to 30c and 31a to 31c of the three-phase unit 53 in the second direction defined in the first embodiment. For example, the air bushings 32a to 32c are connected to tips of the line buses 30a to 30c, and the air bushings 33a to 33c, for example, are connected to tips of the line buses 31a to 31c, respectively. Intervals of the air bushings 32a to 32c and 33a to 33c are equal to each other, for example.

The present embodiment has effects almost identical to those of the second embodiment. The same holds true for the case of providing three or more three-phase units, and the same effects can be achieved as long as the gas insulated switchgear is configured such that the drawing directions of the line buses are opposite to each other between the adjacent three-phase units in the second direction.

Industrial Applicability

As described above, the gas insulated switchgear according to the present invention is suitable for shortening the length of main buses as well as reducing an interphase distance and a breaker-to-breaker distance.

REFERENCE SIGNS LIST 1a to 1c, 2a to 2c, 3a to 3c BREAKER
4a, 6a, 8a, 9a OUTLET
5a to 5c, 7a LINE DISCONNECTOR
10 TRESTLE
11a to 11c OUTLET
13 OPERATING DEVICE
15a to 15c MAIN BUS
16a to 16c, 18a to 18c, 19a to 19c DISCONNECTOR
17a to 17c MAIN BUS
20a to 20c BELLOWS
21a to 21c, 22a to 22c, 24a to 24c DISCONNECTOR
23a to 23c CONNECTION TANK
25a to 25c MAIN BUS
26a to 26c, 27a to 27c LINE BUS
28a to 28c, 29a to 29c AIR BUSHING
30a to 30c, 31a to 31c LINE BUS
32a to 32c, 33a to 33c AIR BUSHING
34 DISCONNECTOR TANK
35a to 35c MAIN BUS
36 to 41 OPERATION CONNECTING ROD
42, 43 OPERATION CONNECTING ROD
50, 51, 52, 53 THREE-PHASE UNIT
60 to 65 OPERATION CONNECTING ROD
70a, 71a, 72a, 73a, 74a, 75a OPERATING SHAFT
80a, 81a to 81c, 84a, 85a INSTRUMENT CURRENT TRANSFORMER
88a to 88c MAIN BUS CONNECTOR
90a, 91a, 92a, 93a, 94a, 95a, 96a, 97a OPERATING SHAFT

The invention claimed is:

1. A gas insulated switchgear comprising a three-phase unit, the three-phase unit including breaker units for three phases, the breaker units being juxtaposed in a second direction that is a horizontal direction, orthogonal to a horizontal, first direction, each of the breaker units including first to third breakers arranged between first and second main buses that extend in the first direction at the same height, the first to third breakers being arranged and connected in series while matching axes of their breaker tanks to one another on the same line parallel to the first direction; and a pair of disconnectors annexed to both sides of an upper portion of each of the breakers, wherein:

each of the disconnectors annexed to the first to third breakers is arranged while a longitudinal direction of the disconnector is set to the second direction so that a switching direction of the disconnector is equal to the second direction;

one of the disconnectors annexed to the first breaker is connected to the first main bus;

the other of the disconnectors annexed to the first breaker is connected to a first line bus and to one of the disconnectors annexed to the second breaker;

the other disconnector annexed to the second breaker is connected to a second line bus and to one of the disconnectors annexed to the third breaker; and the other of the disconnectors annexed to the third breaker is connected to the second main bus.

2. The gas insulated switchgear according to claim 1, wherein:
one end of the one disconnector annexed to the first breaker is arranged on the first breaker, and other end of the one disconnector is drawn to one side along the second direction, the other end of the one disconnector being directly connected to the first main bus; and
one end of the other disconnector annexed to the third breaker is arranged on the first breaker, and the other end of the other disconnector is drawn to a side opposite to the one side along the second direction, the other end of the other disconnector being directly connected to the second main bus.

3. The gas insulated switchgear according to claim 1, comprising:
a first operation connecting rod that extends in the second direction, is connected to an operating shaft of the one disconnector annexed to the first breaker for each phase, and is capable of collectively operating the one disconnectors for three phases;
a second operation connecting rod that extends in the second direction, and is connected to an operating shaft of the other disconnector annexed to the first breaker for each phase, and is capable of collectively operating the other disconnectors for three phases;
a third operation connecting rod that extends in the second direction, is connected to an operating shaft of the one disconnector annexed to the second breaker for each phase, and is capable of collectively operating the one disconnectors for three phases;
a fourth operation connecting rod that extends in the second direction, is connected to an operating shaft of the other disconnector annexed to the second breaker for each phase, and is capable of collectively operating the other disconnectors for three phases;
a fifth operation connecting rod that extends in the second direction, is connected to an operating shaft of the one disconnector annexed to the third breaker for each phase, and is capable of collectively operating the one disconnectors for three phases; and
a sixth operation connecting rod that extends in the second direction, is connected to an operating shaft of the other disconnector annexed to the third breaker for each phase, and is capable of collectively operating the other disconnectors for three phases.

4. The gas insulated switchgear according to claim 1, wherein:
the first line bus is connected to a first line disconnector provided in a lower portion of the other disconnector annexed to the first breaker, extends at a height between a height of the first breaker and a height of the first main bus, and is drawn from between the disconnectors annexed to the first breaker; and
the second line bus is connected to a second line disconnector provided in a lower portion of the other disconnector annexed to the second breaker, extends at a height between a height of the second breaker and a height of the first main bus, and is drawn from between the disconnectors annexed to the second breaker.

5. The gas insulated switchgear according to claim 4, comprising:
a seventh operation connecting rod that extends in the second direction, is connected to an operating shaft of the first line disconnector for each phase, and is capable of collectively operating the first line disconnectors for three phases; and
an eighth operation connecting rod that extends in the second direction, is connected to an operating shaft of the second line disconnector for each phase, and is capable of collectively operating the second line disconnectors for three phases.

6. The gas insulated switchgear according to claim 1, wherein the first and second main buses extend at a height equal to a height of the disconnectors annexed respectively to the first to third breakers.

7. The gas insulated switchgear according to claim 1, wherein the first main bus is arranged in an upper portion of the one disconnector annexed to the first breaker, and the second main bus is arranged in an upper portion of the other disconnector annexed to the third breaker.

8. The gas insulated switchgear according to claim 1, wherein:
each of the other disconnector annexed to the first breaker, the one disconnector annexed to the second breaker, the other disconnector annexed to the second breaker, and the one disconnector annexed to the third breaker has one end arranged on axes of the first to third breakers, and other end drawn to one side in the second direction with respect to the axes of the first to third breakers; and
the first and second line buses are drawn toward the one side.

9. The gas insulated switchgear according to claim 1, wherein a bellows makes at least one of a connection between the other disconnector annexed to the first breaker and the one disconnector annexed to the second breaker, and a connection between the other disconnector annexed to the second breaker and the one disconnector annexed to the third breaker.

10. The gas insulated switchgear according to claim 1, wherein:
each of the first to third breakers is arranged on a trestle; and
operating devices for the first to third breakers are provided in lower portions of the respective breakers.

11. The gas insulated switchgear according to claim 1, wherein:
a plurality of the three-phase units that share the first and second main buses for each phase are arranged along the first direction; and
drawing directions of the first and second line buses are opposite to each other in the second direction between the adjacent three-phase units.

* * * * *